United States Patent Office 3,667,832
Patented June 6, 1972

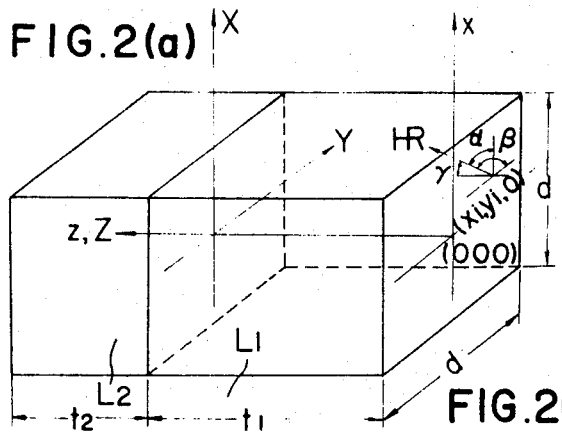
FIG.2(a)
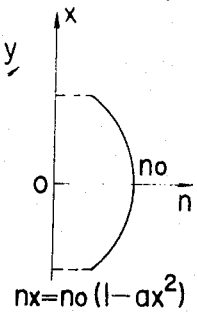
FIG.2(b)
$n_x = n_0(1-ax^2)$
FIG.2(c)
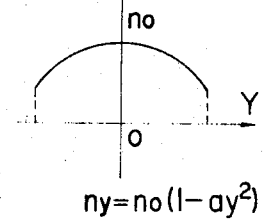
$n_y = n_0(1-ay^2)$
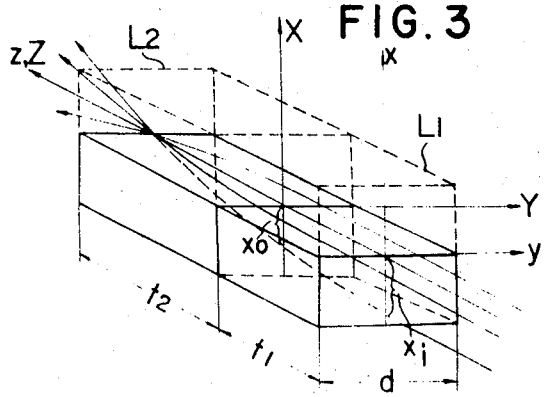
FIG.3
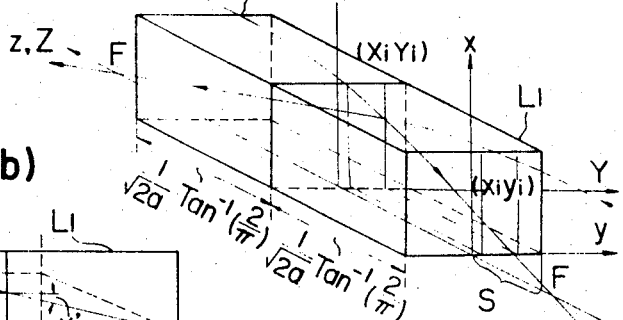
FIG.4(a)
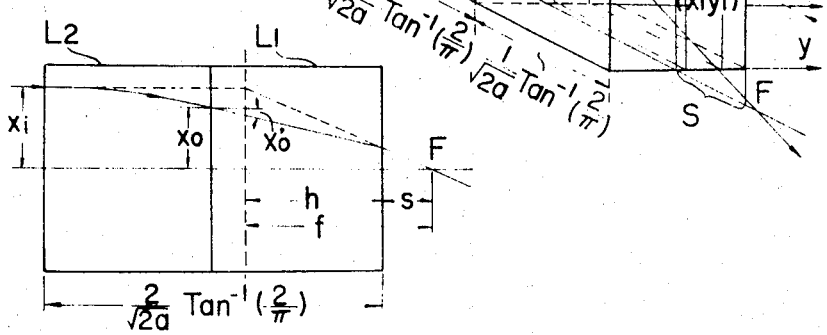
FIG.4(b)

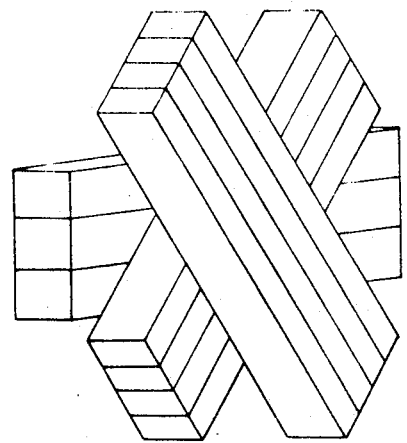
FIG. 5(a)
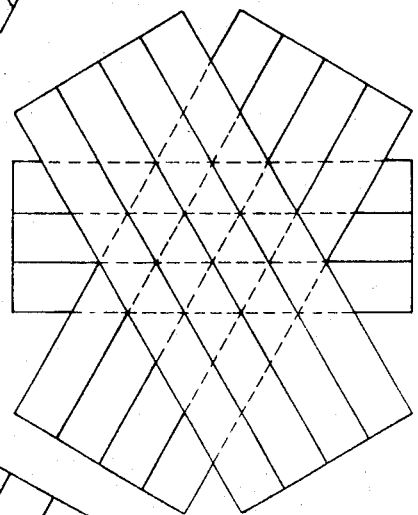
FIG. 5(b)
FIG. 5(c)
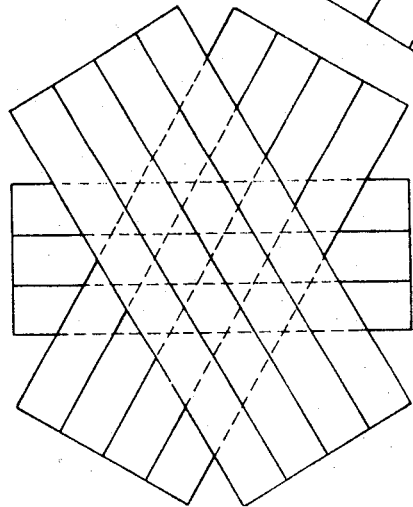

3,667,832
LIGHT-CONDUCTING STRUCTURE COMPRISING CROSSED LENTICULAR GRADIENT INDEX PLATES
Ichiro Kitano, Kobe, and Hiroyoshi Matsumura, Ashiya, Japan, assignors to Nippon Selfoc Kabushiki Kaisha (also known as Nippon Selfoc Co., Ltd.), Tokyo-to, Japan
Filed July 30, 1970, Ser. No. 59,577
Claims priority, application Japan, Aug. 4, 1969, 44/61,887
Int. Cl. G02b 5/14
U.S. Cl. 350—175 GN    5 Claims

ABSTRACT OF THE DISCLOSURE

A light-conducting structure such as a multi-ocular lens or face plate comprising at least two sets of columinar transparent elements, each element having two side surfaces and two light-conducting surfaces, both extended in a plane parallel relation, the element having a Refractive Index distribution in a plane perpendicular to a center plane thereof varying in such a manner that the Refractive Index is gradually decreased proportionally to the second power of distance measured from the center plane, transparent elements constituting each set being assembled successively together along their side surfaces, and the two sets being combined together so that the light-conducting surfaces confront each other, and the lengthwise directions thereof intersect each other at a predetermined angle.

BACKGROUND OF THE INVENTION

This invention relates generally to optical devices for conducting light, and more specifically to a light conducting plate and a multi-ocular lens having a high resolving power and a simple structure.

Heretofore, light conducting plates, in which a number of optical fibers consisting of a core made of a light conducting substance of a high Refractive Index and an enveloping layer made of a light-conducting substance of a lower Refractive Index are arranged and secured together, have been known. When such a light-conducting plate is employed as a face plate of a cathode-ray tube, the light emitted from the fluorescent screen thereof can be recorded directly.

In this light conducting plate, however, individual optical fibers transmit a quantity of light merely as spots, so that the resolving power of the light-conducting plate is determined by the diameter of the optical fibers. Although the resolving power can be improved to a certain extent by decreasing the diameter of the fibers, there is a limitation in the diameter of the optical fibers attainable, as well as in the resolving power, because the production of the optical fibers with a diameter less than 10 microns involves much difficulty. Moreover, the production of the light conducting plate made of optical fibers becomes more complicated and less efficient with decrease in the diameter of the optical fibers.

It has been well known that when a lens plate like a multi-ocular is formed by bundling a plurality of optical lense, the object pattern photographed by means of said lens plate can be reproduced as a three-dimensional image. That is, when the real image of an object is formed on a photographic dry plate, the image on the dry plate corresponds to the images obtained by viewing the object from different directions. Accordingly, at the time of reproduction, if the relation between the dry plate and lens plate is correctly set at the same position as that at the time the object was photographed, and a parallel light beam is radiated from the rear side of the dry plate, this radiated light beam will be caused to return reversely through the same optical path as the path followed in the photographing, whereby a real three-dimensional image can be observed by viewing the lens plate from the position confronting the radiated light beam.

However, for the purpose of manufacturing a multi-ocular such as a "fly-eye lens" or a combination of lenticular lenses, which has a plurality of micro lenses arranged in a plane, long and laborious work is required for grinding the surface of a transparent substance so as to form thereon a plurality of spherical surfaces each having a predetermined curvature. Furthermore, great skill is required to grind the curved surface of a micro lens having a very small diameter, and there is a limitation in fabricating them by hand. For this reason, the production of multi-oculars still remains in the stage of trial production, and mass-production thereof has not been successfully accomplished.

In order to overcome the above described difficulties, a multi-ocular of "fly-eye type" has previously been proposed in commonly assigned copending patent application No. 851,956 filed on Aug. 21, 1969. The multi-ocular lens comprises a number of cylindrical or fibrous light-conducting elements, each having a Refractive Index gradually decreasing from the central portion toward the peripheral portion thereof, bundled together so that the central axes thereof are disposed in parallel. The light conducting elements thus bundled are bonded together and solidified, and cut into a desired length. With the above described construction, there is no necessity of grinding and polishing the curved surfaces of the micro-lenses as mentioned above, and the multi-ocular lens can be manufactured by a mass-production procedure.

However, in the above described construction, the optical fibers or cylindrical elements constituting the multi-ocular are ordinarily circular in cross section, and the gaps between adjoining fibers do not contribute to the image transmission.

SUMMARY OF THE INVENTION

Therefore, a primary object of the present invention is to provide a light conducting structure of multi-ocular type wherein all of the above described short-comings of the conventional construction are substantially eliminated.

Another object of the present invention is to provide a light conducting structure of multi-ocular type which can be produced by a process wherein the laborious and time-consuming procedures required for grinding and polishing the numerous micro-lenses of the conventional construction are completely eliminated.

Still another object of the present invention is to provide a light conducting structure of multi-ocular type wherein the work of assembling the elements constituting the multi-ocular lens plate is far simpler than that in structures of conventional construction.

A further object of the invention is to provide a light conducting structure of multi-ocular type which can be produced by a mass-production procedure, and the cost thereof is substantially reduced.

An additional object of the present invention is to provide a light conducting structure of multi-ocular type which can be employed as a face-plate of the cathode-ray tube.

These and other objects of the present invention can be achieved by a novel construction of a light conducting structure of multi-ocular type which comprises at least two transparent elements each having a refractive index distribution along a cross-sectional plane thereof perpendicular to a center plane, wherein the refractive index is reduced in proportion to the second power of the distance measured from the center plane, and the two or more elements are so assembled together that the center planes of the elements intersect each other at a predetermined angle, and that the elements confront each other through the cross-sectional surfaces thereof perpendicular to the center planes.

The nature, principle, and utility of the invention will be understood more clearly from the following detailed description when read in conjunction with the accompanying drawings, in which like parts are designated by like reference characters.

BRIEF DESCRIPTION OF THE DRAWINGS

In the drawings:

FIG. 2(a) is a greatly enlarged perspective view showing a unit compositional element of the light conducting structure indicated in FIGS. 1(a) and 1(b) above;

FIGS. 2(b) and 2(c) are diagrammatic representations of the distributions of the refractive indexes in the unit element shown in FIG. 2(a);

FIGS. 3, 4(a), and 4(b) are perspective diagrams showing the light paths of parallel light rays entering as incident light a unit element of a light image-conducting structure having a predetermined thickness; and FIGS. 5(a), 5(b), and 5(c) are respectively perspective, planar, and planar views showing light conducting structures have operational characteristics equivalent to those of constructions wherein a number of micro-lenses having regular triangular or hexagonal configurations are arranged in a regular manner.

DETAILED DESCRIPTION OF THE INVENTION

Figure 1A:
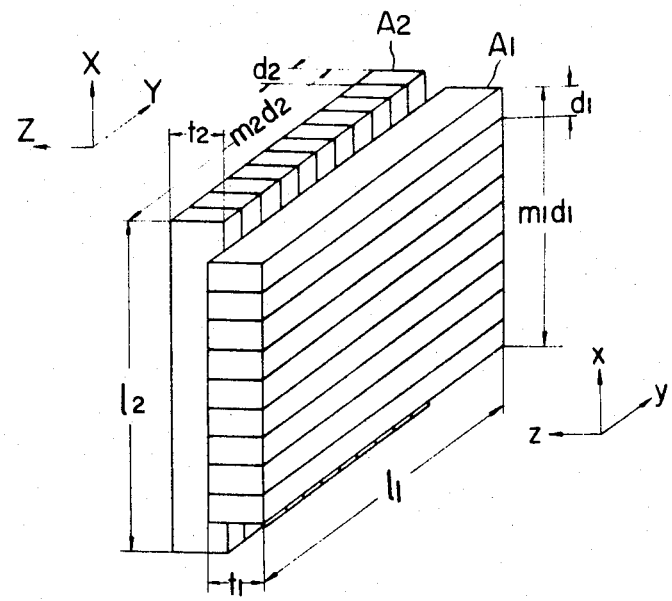
FIG. 1(a) is a fragmentary, enlarged perspective view of a light conducting structure according to the present invention (FIG. 1(b) is a planar view of the light conducting structure shown in FIG. 1(a)
Figure 1B:
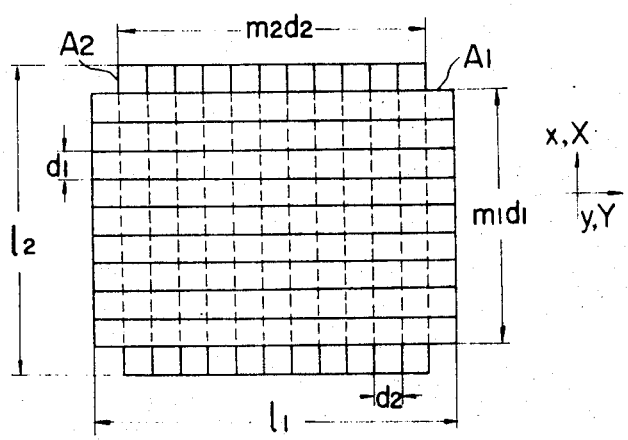

Referring now to FIGS. 1(a) and 1(b), showing a typical construction of the light conducting structure according to the present invention, there are indicated two sets of transparent elements A1 and A2 constituting the light conducting structure. One of the sets A1 consists of a number of the transparent elements equal to $m_1$ ($m=1, 2, 3 \ldots$) stacked in the direction of an $x$ coordinate, each having a depth $d_1$, width $t_1$, and a Refractive Index varying substantially in accordance with the following equation.

$$n_x = n_0 (1 - ax^2) \quad (1)$$

wherein, $n_0$ is the Refractive Index along a central plane $x=0$ located at an intermediate point of the depth $d_1$, and $a$ is a positive constant.

Likewise, the set A2 consists of a number of the transparent elements equal to $m_2$ ($m_2=1, 2, 3, \ldots$) stacked in the direcon of a Y coordinate orthogonal to the X coordinate, each having a depth $d_2$, width $t_2$, length $l_2$, and a refractive index varying substantially according to the following equation.

$$N_Y = N_0 (1 - bY^2) \quad (2)$$

wherein, $N_0$ is the refractive index along a center plane $Y=0$ located at an intermediate point of the depth $d_2$, and $b$ is a positive constant.

The sets A1 and A2 of the transparent elements are assembled together in such a manner that their respective coordinates $x$, $y$, and $z$ and X, Y, and Z are disposed in the same directions, that is, the directions $x$ and $Y$ along which the refractive indexes of the sets are varied respectively are perpendicular to each other. The light conducting structure thus assembled, with the widths $t_1$ and $t_2$ and also the interval between the two groups of the transparent elements A1 and A2 selected to be of suitable values, constitutes a multi-ocular lens structure of extremely advantageous characteristics.

A process for producing the transparent elements has been disclosed in commonly assigned copending patent application No. 806,368 filed on Mar. 12, 1969 now abandoned. As described therein, a glass plate containing certain cations constituting a modifying oxide of the glass and imparting a greater contribution toward an increase in the refractive index, for instance, thallium ions, is brought into contact with a salt including another kind of cations also constituting a modifying oxide for the glass but imparting less contribution toward an increase in the refractive index, such as alkaline ions, whereby the glass plate is caused to have a distribuiton of the refractive index gradually varying from the contacting surface toward the interior thereof. The glass plate is thereafter cut into a plurality of pieces having a predetermined measurement, and these pieces are then ground and polished.

More specifically, the invention utilizes the fact that light rays advancing in a glass plate as described above with a refractive index varying in a direction transverse to the advancing direction of the light rays are gradually bent toward the portion of the glass plate wherein the refractive index is higher than the other portions. Assuming that the radius of curvature of the light path is $\rho$, the refractice index of the glass at a point is $n$, and the rate of variation of the refractive index along a perpendicular at that point is $\partial n / \partial N$, following relation is obtained.

$$\frac{1}{\rho} = \frac{1}{n} \frac{\partial n}{\partial N} \quad (3)$$

For this reason, light rays entering as incident light a surface of the glass plate, wherein the Refractive Index is gradually decreasing from the central portion to the outer portions thereof, at an angle less that a limiting angle will advance through the glass plate in an undulating path around the center plane.

From the combination of a set A1 of the transparent elements and another set A2 of the similar elements as illustrated in FIG. 1, a number equal to $m \times m$ of unit compositions are produced (for the simplification, it is assumed that $m_1 = m_2 = m$, $d_1 = d_2 = d$, and $l_1 = l_2 = md$). The focusing effect in any one of these unit compositions will be explained with reference to FIG. 2(a).

Now, taking the center of an incident end surface of $d \times d$ as the origin of the coordinates for the first transparent element $L_1$ and the center of a similar surface of the second transparent element $L_2$ as the origin of the coordinates for the second element, coordinates $(x, y, z)$ and $(X, Y, Z)$ are for the first element $L_1$ and the second element $L_2$.

A light vector $1k$ incident with respect to an end surface of the first element $L_1$ at an arbitrary position $(x_i, y_i, 0)$ with direction cosine $(\cos \alpha, \cos \beta, \cos \gamma)$ will now be considered with the assumption that the refractive index distribution in the element $L_1$ is given with respect to the x-coordinate as shown in FIG. 2(b) and is expressed by Eq. (1). As a result of calculation, the equation for the light rays passage within the element $L_1$ belonging to the A1 is expressed as follows.

$$x = -\frac{\sqrt{k_0^2 n_0^2 - C_1^2 - C_2^2}}{\sqrt{2a}k_0 n_0} \sin \frac{\sqrt{2a}k_0 n_0}{C_1} (z_0 - z)$$

$$z_0 = \frac{C_1}{\sqrt{2a}k_0 n_0} \sin^{-1} \frac{\sqrt{2a}k_0 n_0 x_i}{\sqrt{k_0^2 n_0^2 - C_1^2 - C_2^2}} \quad (4)$$

$$x = -\frac{\sqrt{k_0^2 n_0^2 - C_1^2 - C_2^2}}{\sqrt{2a}K_0 n_0} \sin \frac{\sqrt{2a}K_0 n_0}{C_2} (y_0 - y)$$

$$y_0 = \frac{C_2}{\sqrt{2a}k_0 n_0} \sin^{-1} \frac{\sqrt{2a}k_0 n_0 x_i}{\sqrt{k_0^2 n_0^2 - C_1^2 - C_2^2}} + y_i \quad (5)$$

$$y = \frac{C_2}{C_1} z + y_i \quad (6)$$

wherein, $$|1k| = K = \sqrt{k_x^2 + k_y^2 + k_z^2} = k_0 n_x$$
$$k_x = k \cos \alpha, \; k_y = k \cos \beta, \; k_z = k \cos \gamma \quad (7)$$

It is apparent that the vector $1k$ is a wave number vector of a plane wave with the direction thereof being coincident with the transmitting direction of the plane wave.

Since the element $L_1$ has a light focussing nature along the $x$ axis only, $$k_z = \text{a constant} = C_1$$
$$k_y = \text{a constant} = C_2$$

Equations 4, 5, and 6 are light equations in a most ordinary form indicating the light paths within the element $L_1$, and with the use of these equations, it will be determined whether the rays of incident light entering the central point ($x_1 = y_1 = 0$) of the element $L_1$ in the same direction as described before will converge to a central point ($X = Y = 0$) or not after passing through the element $L_2$. As before, the origin of the coordinates (X, Y, Z) is taken at the center of the forward end surface of the element $L_2$, and the distribution of the Refractive Index along the Y axis in the element $L_2$ is assumed to be varied in accordance with Equation 2. Furthermore, for simplification of this analysis, the distribution constant $b$ of the Refractive Index and the initial value No. of the Refractive Index at the central point are all assumed to be equivalent to those for the element $L_1$ as indicated in FIG. 2(c), that is $a = b$ and $n_0 = N_0$.

From Eq. 4, the incident point $X_0$ of the light rays entering the element $L_2$ can be easily obtained as follows.

$$X_0 = \frac{C_1 \frac{dx}{dz}\big|_{z=0}}{\sqrt{2a}k_0 n_0} \sin \frac{\sqrt{2a}k_0 n_0}{C_1} t_1$$

wherein, $$\frac{dx}{dz}\bigg|_{z=0} = \sqrt{\frac{\sin \rho}{\cos^2 \gamma} - 1} \quad (8)$$

Again $x_1$ and $x_1'$ respectively represent an incident point of a light ray entering the element $L_1$ and the inclination thereof at that point, and also $x_0$ and $x_0'$ respectively represent an exit point of the same light ray from the element $L_1$ and the inclination thereof at that point. Then, there is a relation:

$$\frac{\sqrt{2a}k_0 n_0}{C_1} = \sqrt{2a}[1 + ax_1^2 + \tfrac{1}{2}(x_1')^2]$$

If the values of $ax_1^2$ and $\tfrac{1}{2}(x_1')^2$ are sufficiently smaller than unity, $x_0$ can be expressed as $$X_0 = \frac{\frac{dx}{dz}\big|_{z=0}}{\sqrt{2a}} \sin \sqrt{2a}t_1 \quad (8')$$

and from Eq. 6, $$Y_0 = \frac{\cos \beta}{\cos \gamma} t_1 \quad (9)$$

The direction cosines for the light ray thereafter entering the element $L_2$ are $$\cos \alpha_1 = \sqrt{1 - (\cos^2 \beta + \cos^2 \gamma)/(1 - aX_0^2)}$$
$$\cos \beta_1 = \frac{\cos \beta}{1 - aX_0^2}$$
$$\cos \gamma_1 = \frac{\cos \gamma}{1 - aX_0^2} \quad (10)$$

As a result, the light equation within the element $L_2$ is expressed as $$Y = Y_0 \cos \sqrt{2a}Z + \frac{\frac{dY}{dZ}\big|_{Z=0}}{\sqrt{2a}} \sin \sqrt{2a}Z$$

herein, $$\frac{dY}{dZ}\bigg|_{Z=0} = \pm \sqrt{\frac{\sin 2\alpha_1}{\cos^2 \gamma_1}} \quad (11)$$

and $$X = \frac{\cos \alpha_1}{\cos \gamma_1} Z + X_0 \quad (12)$$

With the above light equations, when a condition satisfying $X = 0$ and $Y = 0$ simultaneously is sought, a relation $$\frac{\cos \beta}{\cos \gamma}\left[\tan\left\{-\sqrt{\frac{\sin^2 \beta - \cos^2 \gamma}{(1 - aX_0^2) - \cos^2 \beta - \cos^2 \gamma}} \sin \sqrt{2a}tl\right\}\right.$$
$$\left. \pm \sqrt{2a}t_1\right] \quad (13)$$

is obtained, and this relation is always fulfilled when $$\beta = \pi/2$$

This means that the light rays packing through the element $L_2$ are again converged at a position on the Z axis. When $\beta \neq \pi/2$, the paths of the light rays intersect the Z axis at different positions depending on the incident conditions, and hence such rays are ordinarily considered to have inferior converging characteristics. However, if the incident angle of the light rays is comparatively small, and the light enters the surface of the element $L_1$ almost along the $z$ axis, and furthermore, when $\sqrt{2a}t_1$ is comparatively small, the above described condition (13) is substantially fulfilled, and for this reason, these rays of the light are considered to have converging characteristics.

In the first mentioned case where $\beta = \pi/2$ light equations within the element $L_1$ are expressed as follows.

$$x_0 = x_i \cos \frac{\sqrt{2a}k_0 n_0}{C_1} t_1 + \frac{C_1 x_i'}{\sqrt{2a}k_0 n_0} \sin \frac{2ak_0 n_0}{C_1} t_1 \quad (14)$$

$$x_0' = -\frac{\sqrt{2a}k_0 n_0}{C_1} x_i \sin \frac{\sqrt{2a}k_0 n_0}{C_1} t_1$$
$$+ x_i' \cos \frac{\sqrt{2a}k_0 n_0}{C_1} t_1 \quad (15)$$

In these equations, if the values of $ax_i^2$ and $\tfrac{1}{2}(x_i')^2$ are sufficiently smaller than unity, the above equations can be rewritten as $$x_0 = x_i \cos \sqrt{2a}t_1 + \frac{x_i'}{\sqrt{2a}} \sin \sqrt{2a}t_1 \quad (16)$$

$$x_0' = -\sqrt{2a}x_i \sin \sqrt{2a}t_1 + x_i' \cos \sqrt{2a}t_1 \quad (17)$$

These equations constitute light equations according to the present invention for a combined element ($L_1$, $L_2$), wherein the component elements $L_1$ and $L_2$ are combined together perpendicularly.

Then, the fact that a lens structure having an advantageous characteristic can be formed by selecting the values of the lengths $t_1$ and $t_2$ suitably will now be explained.

The lengths of the elements $L_1$ and $L_2$ adapted to converge parallel incident light rays entering an end surface of the first element $L_1$ at a point on the exit end surface of the element $L_2$ will be calculated. Referring to FIG. 3, the length of the element $L_2$ which makes possible the focusing of parallel incident light rays along a central plane of the element $L_1$ at point on the Z-axis of the element $L_2$ can be calculated from the Eq. 16 as $$t_2 = \frac{1}{\sqrt{2a}} \cdot \frac{\pi}{2} \quad (18)$$

On the other hand, an incident light ray entering through a point $(x, 0, 0)$ on the x-axis is refracted toward the center plane $(x=0)$ of a maximum refracting index, and after passing through a point $x_0$ on the exit side end surface of the element $L_1$, the light ray is advanced through the element $L_2$ with a constant inclination $$x_o' = x_o / \frac{\pi}{2\sqrt{2a}}$$

until it intersects the Z-axis. For the above described point to coincide with the first mentioned point, the length $t_1$ of the element $L_1$ must fulfil the following relationship.

$$t_1 = \frac{1}{\sqrt{2a}} \tan^{-1}\left(\frac{2}{\pi}\right) \quad (19)$$

as is apparent from Eqs. 16 and 17.

When the lengths of the elements $L_1$ and $L_2$ are as expressed by Eqs. 19 and 18, respectively, it will be apparent from the light Equations 16 and 17 applicable to the light of small incident angle that an incident light ray entering the element $L_1$ at an arbitrary point $(x_i, y_i, 0)$ enters into the element $L_2$ at a point $(X_i, Y_i)$, wherein, $$\left.\begin{array}{l} x_i = x_i \cos\sqrt{2at_1} \\ Y_i = y_i \end{array}\right\} \quad (20)$$

with an incident angle of $$x_{i'} = -\sqrt{2ax_i} \sin\sqrt{2at_i} \quad (21)$$

Thus, the light equations within the element $L_2$ can be expressed as $$\left.\begin{array}{l} X = X_{i'} Z + x_i \\ Y = Y_i \cos\sqrt{2at_2} \end{array}\right\} \quad (22)$$

When Eqs. 20, 21, and 18, 19 are substituted in Eq. 22, $X = Y = 0$ is obtained. From this result, it is apparent that all of the parallel light rays incident upon the forward end surface of the element $L_1$ regardless of the incident point are focused at a point located at the center of the exit side surface of the element $L_2$.

As is apparent from a comparison of the Eq. 18 with the Eq. 19, the length $t_1$ of the element $L_1$ is shorter than the length $t_2$ of the element $L_2$. If the actual length of the element $L_2$ is determined from Eq. 19 similarly as $t_1$ for the element $L_1$, the focusing point will be outside of the element $L_2$ as shown in FIG. 4($a$). Since the incident side and the outgoing side of this unit combination of the elements is symmetrical with respect to a vertical central plane thereof, it can be considered to constitute a lens.

The focal length $f$, the location $h$ of the principal plane of the lens, and the position $s$ of the focus measured from the end surface of the element can be calculated as follows:

$$f = \frac{1}{n_0\sqrt{2a} \sin\sqrt{2at}} \quad (23)$$

$$s = \frac{1}{n_0\sqrt{2a} \sin\sqrt{2at}} \left[\cos\sqrt{2at} - \mathrm{Tan}^{-1}\frac{2}{\pi}\sqrt{2at}\right] \quad (24)$$

$$h = \frac{1}{n_0\sqrt{2a} \sin\sqrt{2at}} \left[1 \cos\sqrt{2at} + \tan^{-1}\frac{2}{\pi}\sin\sqrt{2at}\right] \quad (25)$$

Since the length $t$ is restricted by Eq. 19, the above equations can be simplified as follows.

$$f = 1.86 \frac{1}{n_0\sqrt{2a}} \quad (26)$$

$$s = 1.01 \frac{1}{n_0\sqrt{2a}} \quad (27)$$

$$h = 0.86 \frac{1}{n_0\sqrt{2a}} \quad (28)$$

If the lengths of the elements $L_1$ and $L_2$ are lengths determined by Eq. 18, the focussing lines of the elements $L_1$ and $L_2$ will intersect perpendicularly at the junction surface of the elements $L_1$ and $L_2$, and it will appear as though the focal point is created at that position. More generally speaking, the location of the focussing line measured from the end surface of a light conductive element of a length $t$ and having a light converging nature along its one axis can be expressed as $$S = \frac{1}{n_0\sqrt{2a}} \cot\sqrt{2at} \quad (29)$$

For this reason, if the light conducting elements of length $t_1$ and $t_2$ are combined so that the focussing lines thereof intersect in a perpendicular manner, maintaining a distance $(s_1+s_2)$ between these light conducting elements ($s_1$ and $s_2$ being respective values of $s$ obtained when $t_1$ and $t_2$ are substituted in the Eq. 29), a lens-like structure having a focal point at the intersection of the above mentioned focussing lines can be obtained.

Furthermore, if three of the light conducting elements $L_1$, $L_2$, and $L_3$, within which the lengths of $L_1$ and $L_3$ are made equal to a value $t_{1,3}$ and the length of $L_2$ is made equal to $t_2$, are employed, and relations $$\sqrt{2a}t_{1,3} = -\tan\frac{\sqrt{2a}}{2}t_2 \quad (30)$$

$$\frac{\sqrt{2a}t_2}{2} = -\tan\sqrt{2a}t_{1,3} \quad (31)$$

are satisfied by these values $t_{1,3}$ and $t_2$, and if the light-conducting elements are arranged in the order of $L_1$, $L_2$, and $L_3$ so that the Refractive Index distribution direction of the element $L_2$ is substantially perpendicular to those of the elements $L_1$ and $L_3$, and the center planes of the elements $L_1$ and $L_3$ coincide with each other, then the combined structure thus constructed will have principal planes of these structures coincident with both of the end surfaces thereof, whereby an equally multiplied erect image of an object placed in close contact with either one end surface of the light-conducting combined structure can be obtained on the other end surface thereof.

For this reason, it is apparent that the above mentioned combined structure can be employed as a face-plate having a lens effect or a resolving power. Since the face-plate thus constructed in accordance with the present invention includes substantially no inactive area for passing light, a far brighter image of an object can be obtained on the surface on the image forming side, and the diameter of the face-plate may also be easily expanded.

Although the above described analysis has been undertaken with respect to a light-conducting combined structure including two or more of transparent elements combined together in such a manner that the directions along which the Refractive Indexes of the elements adjacent each other are varied intersect substantially perpendicularly, it will be apparent that these directions do not need to intersect perpendicularly in all cases, and that they may intersect with an angle other that 90°. In the latter case, the number of the light conducting elements to be arranged along the direction of advance of the light, the lengths of the individual light conducting elements along the light-conducting direction, and the distributions of Refractive Index in these elements may be determined suitably so that a light-conducting combined structure having a lens effect and utilizable in various kinds of applications is thereby obtained.

For instance, as indicated in FIG. 5($a$) in the accompanying drawings, three sets of the light-conducting elements may be arranged in a closely contacting manner so that the refractive index distribution directions of these elements intersect each other at 60°, whereupon a light-conducting combined structure operable similarly as those having a number of micro-lenses arranged in a regular manner and each having an equilateral triangular or hexangular configuration as shown in FIGS. 5(b) and 5(c) can be obtained.

As described above, the light-conducting structure according to the present invention comprises at least two light-conducting or transparent elements each having a refractive index distribution in a cross section perpendicular to a center plane varying in such a manner that the refractive index is decreased from a specific value in proportion to the second power of distance measured from the center plane. The transparent elements confronting each other are characterized in that the elements are further arranged in such a manner that the center planes as described above intersect each other at a predetermined angle, and the elements confront each other through cross-sectional planes thereof traversing the center planes, respectively. With the use of the light-conducting structure according to the present invention, not only a multi-ocular lens equivalent to a fly-eye lens having a number of cylindrical lenses bundled together, but also those equivalent to an integrated construction including two conventional lenticular plates interconnected perpendicularly or to a face-plate having a resolution power, all employable in three-dimensional photography and holography or in a large sized cathode-ray tube for facsimile reproduction can be easily fabricated. Furthermore, if, during the assembling of the light-conducting structure, a light absorbing layer is deposited on the side surfaces of each of the light converging columnar elements so that a light insulation characteristic is thereby imparted to the surfaces between the adjacently disposed light-conducting columnar elements, lowering of the contrast in the image caused in the image transmission can be satisfactorily prevented.

Various examples of the light-conducting structure according to the present invention will now be described in detail. The blank plates employed in these examples were all produced in the following common manner.

A material glass composed of 48 wt. percent of $SiO_2$, 12 wt. percent of $Na_2O$, 16 wt. percent of $Tl_2O$, and 24 wt. percent of PbO was melted and formed into a glass plate having an approximate thickness of 0.6 mm. The glass plate was taken out of a dipping vessel after it was kept in a potassium nitrate bath at 470° C. for 90 hours, and was polished on both surfaces thereof so that parallel surfaces having about 0.5 mm. thickness therebetween were obtained. The glass plate was then maintained in an electric furnace at about 450° C. wherein hydrogen gas was supplied, so that the glass plate was subjected to a reduction treatment.

The glass plate thus reduced was cooled slowly to room temperature and again polished over its surfaces. It was found that a black light absorbing layer of about 30μ was formed on the surfaces of the glass plate as a result of the above mentioned treatment for reduction of PbO and $Tl_2O$ ingredients. The refractive index on both surfaces of the glass plate was 1.572, and when the distribution, toward the central portion, of the refractive index within the glass plate was measured, with a certain amount of thicknesses being removed consecutively, it was found that the Eq. 1 could be applied to the refractive index distribution. The refractive index value number for the central portion of the glass plate was found to be 1.597, and the value of the constant $a$ was 0.25 mm.$^{-2}$.

The surrounding edge portions of the glass plate was thereafter removed, and blank plates to be used in Examples 1 through 4 which will be hereinafter described were obtained.

EXAMPLE 1

From the above described blank plate, small element pieces of columnar configuration having about 2 mm. width and 55 mm. length were cut, and about 100 element pieces were stacked in the direction of their thickness. The flat-plate structure thus formed having a size of about 55 mm. x 53 mm. x 2 mm. thickness was polished on both surfaces, which were thereby rendered into parallel planes so that a resultant thickness of about $$t_1 = \frac{1}{\sqrt{2a}} \tan^{-1}\left(\frac{2}{\pi}\right) = 0.80 \text{ mm.}$$

was obtained.

Likewise, small element pieces of a columnar configuration having about 3 mm. width and 55 mm. length were cut from the blank plate, and about 100 pieces thereof were stacked in the direction of the thickness. A flat-plate structure thus formed having a thickness of about 3 mm. was polished until a thickness of $$t_2 = \frac{1}{\sqrt{2a}} \cdot \frac{\pi}{2} = 2.22 \text{ mm.}$$

was obtained.

The two kinds of the plate structures thus formed were assembled together in a manner such that the stacked directions of these two structures intersected with each other perpendicularly, so that a light-conducting structure of about 3.02 mm. thickness, about 53 mm. width, and about 53 mm. length was obtained.

When parallel light rays were projected onto the light-conductive structure from the side of the plate having 0.80 mm. thickness, it was found that numerous focus points (100 × 100 points) were created on the exit end surface of the light-conducting structure. The light-conducing structure of this type was found to be utilizable for printing of simultaneously minimized polyhedral views of an object, three dimensional photography, and holography.

EXAMPLE 2

From the blank plate as in the case of Example 1, a plurality of element pieces each having about 100 mm. length and about 2 mm. width were cut, and about 200 of such pieces were stacked in the direction of the thickness so that a plate structure of about 2 mm. thickness and 100 mm. x 100 mm. size was obtained. Two of such plate structures were polished on both of their surfaces so that the 2 mm. thickness of each was reduced to $$t = 0.80 \text{ mm.} \left[ = \frac{1}{\sqrt{2a}} \tan^{-1}\frac{2}{\pi} \right]$$

The two plate structures were combined together in an overlapping relation so that the stacked directions of the element pieces were perpendicular to each other, and a light-conducting structure of about 100 mm. x 100 mm. x 1.60 mm. was obtained.

This light-conducting structure was found to have a focal point separated from the end surface by a distance $s = 0.89$ mm. whenever a parallel incident light was caused to enter the light-conducting structure through the surface on the entrance side thereof, whereby a light-conducting structure of multi-ocular type containing about 40,000 minute lenses each having a focal length of $f = 1.65$ was obtained. It was found that this type of light-conducting structure could produce inverted images of an object which was observed from various different directions. This type of light-conducting structure can be effectively employed in so-called integral-photography which can constitute a fundamental technique for achieving three-dimensional photography.

EXAMPLE 3

From the same blank plate employed for Example 1, a number of element pieces were cut, and 4 plate structures, each composed of about 100 element pieces stacked in the direction of the thickness of the element pieces, were prepared. Of these four plate structures, two were polished to a thickness $$t = 2.22 \text{ mm.} \left( = \frac{1}{\sqrt{2a}} \cdot \frac{\pi}{2} \right)$$

and the other two were polished to a thickness of $t=1.50$ mm.

The first two plate structures were so combined that the stacked directions in these structures were perpendicular to each other, and a light-conducting structure of 4.44 mm. thickness and about 50 mm. x 50 mm. size was obtained.

The second pair of planar structures was also combined together so that the stacked directions of these plate structures were disposed perpendicular to each other. In addition to these combined structures, a glass plate having a refractive index of $ng=1.520$ was polished to a thickness which was twice the value $n_0 S$ calculated from Eq. 29, that is, to $n_0 \times s \times 2 = 1.15$ mm. This glass plate was placed between the above described two combined structures, so that the three component plates were bonded together into a consolidated light-conducting structure of about 4.16 mm. thickness and 50 mm. x 50 mm. size. The light-conducting structure thus obtained created focussing lines, caused by the individual elemental pieces, perpendecularly intersecting at the central portion thereof, whereby a number of focal points equal to the number of the intersecting points were obtained.

The light-conducting structure having the above described characteristics can be expected to have high utility in the field of the holographic techniques.

EXAMPLE 4

From the blank plate as described before, a number of element pieces having 10 mm. width and 220 mm. length were cut. Two combined plates, in each of which 100 pieces thus cut were stacked in the direction of the thickness, were prepared and denoted by A1 and A3. Both of these combined plates A1 and A3 were polished so that their thicknesses of about 10 mm. were reduced to the hereinbefore indicated value of $t_{1,3}=2.87$ mm. Likewise, from the above described blank plate, a number of element pieces having about 10 mm. width and about 55 mm. length were cut, and about 400 of these element pieces were stacked and bonded together so that a combined plate A2 was obtained. This combined plate A2 of about 10 mm. thickness was polished to $t_2=5.74$ mm. Here, it should be noted that these thicknesses $t_{1,3}$ and $t_2$ satisfy the above described Eqs. 30 and 31.

The combined plates A1, A2, and A3 were arranged in this order so that the stacked directions in these plates intersected perpendicularly, and yet the center planes of the plates A1 and A3 were aligned with each other. These plates were then bonded together so that a light-conducting structure of 11.48 mm. thickness, 50 mm. width, and 200 mm. length was obtained. When an object was placed in a closely contacting manner to one end surface of the light-conducting structure, an erect image of equal-magnification was obtained at the other end surface thereof, whereby the light-conducting structure proved to have sufficient effectiveness to be used as a faceplate.

We claim:
1. A light-conducting structure comprising: first and second lenticular plates each composed of a plurality of elongated transparent bodies; each body having two mutually parallel and flat side surfaces and two mutually parallel and flat light-conducting surfaces all extending along the length of the body and wherein said side surfaces are perpendicular to said light-conducting surfaces; each body constituting said first lenticular plate having the same distance $d_1$ between both side surfaces, the same distance $t_1$ between both light-conducting surfaces and having the same Refractive Index distribution in a plane perpendicular to a center plane between said two side surfaces varying in such a manner that the Refractive Index $n$ satisfies the relationship $n=n_0(1-aX^2)$, where $n_0$ is the refractive index at the center plane, X is a perpendicular distance from the center plane, and $a$ is a positive constant; each body constituting said second lenticular plate having the same distance $d_2$ between both side surfaces, the same distance $t_2$ between both light-conducting surfaces and having the same refractive index distribution in a plane perpendicular to a center plane between said two side surfaces varying in such a manner that the Refractive Index N satisfies the relationship $N=N_0(1-bY^2)$, where $N_0$ is the refractive index at the center plane, Y is a perpendicular distance from the center plane, and $b$ is a positive constant; wherein said distance $t_1$ is equal to or less than

$$\frac{1}{\sqrt{2a}} \cdot \frac{\pi}{2}$$

and said distance $t_2$ is equal to or less than $$\frac{1}{\sqrt{2b}} \cdot \frac{\pi}{2}$$

said first and second lenticular plates each having their respective transparent bodies assembled together in succession along their side surfaces with their respective light-conducting surfaces defining a surface portion of said lenticular plate; and wherein said first and second lenticular plates are combined togther in an integral structure having a light-conducting surface of each body of said first lenticular plate in close contact with and orientated 90° with respect to a light-conducting surface of each body of said second lenticular plate.

2. A light-conducting structure as defined in claim 1; wherein the distance $d_1$ is equal to $d_2$, the constant $a$ is equal to $b$, and the distance X is equal to Y, said thickness $t_1$ between the light-conducting surfaces of each body in said first lenticular plate being defined by $$t_1 = \frac{1}{\sqrt{2a}} \tan^{-1}\left(\frac{2}{\pi}\right)$$

and said thickness $t_2$ between the light-conducting surfaces of each body in said second lenticular plate being defined by $$t_2 = \frac{1}{\sqrt{2a}} \cdot \frac{\pi}{2}$$

to thereby focus parallel light incident upon the inlet surface of said first lenticular plate on the outlet surface of said second lenticular plate.

3. A light-conducting structure as defined in claim 1; wherein the distance $d_1$ is equal to $d_2$, the constant $a$ is equal to $b$, the distance X is equal to Y and the thickness $t_1$ is equal to $t_2$.

4. A light-conducting structure as defined in claim 1; wherein each said body is provided on the side surfaces thereof with a light-absorbing layer.

5. A light-conducting structure as defined in claim 1; wherein said each body is composed of glass including $SiO_2$.

References Cited

UNITED STATES PATENTS

| | | | |
|---|---|---|---|
| 2,981,140 | 4/1961 | Ogle | 350—167 |
| 3,084,453 | 4/1963 | Brown | 350—167 X |
| 3,151,520 | 10/1964 | Nadeau | 350—167 X |
| 3,083,123 | 3/1963 | Navias | 350—175 GN X |
| 3,320,114 | 5/1967 | Schulz | 350—96 R X |
| 3,434,774 | 3/1969 | Miller | 350—175 GN X |
| 3,486,808 | 12/1969 | Hamblen | 350—175 GN |

OTHER REFERENCES

Wood, Physical Optics, 2nd Edition, textbook published in 1911, pp. 86–91 cited.

Miller, article in Bell System Technical Journal vol. 44, No. 9, November 1965, pp. 2017–2030 cited.

DAVID H. RUBIN, Primary Examiner

U.S. Cl. X.R.

350—96 (B), 167